XR 3,833,893
TX 3045Y
X 3044D
X 3049W

United States Patent
Rajchman

[11] 3,833,893

[45] Sept. 3, 1974

[54] HOLOGRAPHIC MEMORY INCLUDING CORNER REFLECTORS

[75] Inventor: Jan Aleksander Rajchman, Princeton, N.J.

[73] Assignee: RCA Corporation, New York, N.Y.

[22] Filed: Oct. 24, 1972

[21] Appl. No.: 299,771

[52] U.S. Cl. ........... 340/173 LM, 250/199, 350/3.5, 350/161

[51] Int. Cl. ......................... G11c 13/04, G11b 7/00

[58] Field of Search ............. 350/161, 3.5; 250/199; 340/173 LM, 173 LS

[56] References Cited

UNITED STATES PATENTS

| | | | |
|---|---|---|---|
| 2,281,280 | 4/1942 | Gabor | 350/161 |
| 3,479,109 | 11/1969 | Preston | 350/161 |
| 3,614,189 | 10/1971 | Stewart | 340/173 LM |
| 3,656,121 | 4/1972 | Rajchman | 350/3.5 |
| 3,675,989 | 7/1972 | Pietsch | 250/199 |

*Primary Examiner*—Stuart N. Hecker
*Attorney, Agent, or Firm*—Edward J. Norton; Carl V. Olson

[57] ABSTRACT

An electrically and optically accessible memory is disclosed in which binary information is stored in a holographic storage medium with a relatively high packing density by an organization in which lenses are eliminated and corner reflectors are used. A laser beam is directed to an illumination hologram to illuminate an array of controllable corner reflectors each of which reflects to represent a "1" and does not reflect to represent a "O". The reflected light returns as an object beam through the illumination hologram to the storage medium, where it interferes with laser light transmitted through the illumination hologram as a reference beam to form a hologram in the storage medium. The stored information is read out by directing the laser beam through the illumination hologram to the storage medium as a reference beam to cause the stored hologram to be read out through the illumination hologram to photosensors associated with the corner reflectors.

10 Claims, 9 Drawing Figures

3833893
OR IN 340/173LM

HOLOGRAPHIC MEMORY INCLUDING CORNER REFLECTORS

BACKGROUND OF THE INVENTION

The invention relates to electrically and optically accessible memories, such as the one described in U.S. Pat. No. 3,656,121 issued on Apr. 11, 1972 to J. A. Rajchman et al. The memory described in the patent includes a randomly and electrically accessible semiconductor "page" memory. The semiconductor page memory is conventional to the extent that it includes a planar array of electrically-accessible flip-flops for storing a corresponding number of binary information bits. In addition, each flip-flop is provided with a photosensor by which the flip-flop can be set in response to received light, and is provided with a light valve controlled by the state of the flip-flop. A laser light source, a light deflector and holographic optics are provided to create a hologram of the array of light valves at any one of many small areas on an erasable holographic storage medium. Subsequently, the hologram can be illuminated to recreate and project the image of the array of light valves onto the array of photosensors to return the information to the flip-flops in the semiconductor page memory. In this way, the semiconductor page memory serves as a page-at-a-time electrical input-output unit for a great many pages of information stored optically on the erasable holographic storage medium.

The above-described memory system includes a number of lenses, including a relatively very large and expensive lens for imaging the page array of light valves on a small area of the holographic storage medium. The number of binary information bits which can be stored in a given area on the holographic storage medium varies inversely with the square of the lens aperture f number. That is, a large f1 lens permits sixteen times as many binary information bits in a page array to be stored in a hologram of given size as does an f4 lens. Large aperture (low f number) lenses suitable for the purpose are physically very large and are very difficult and expensive to produce. It is therefore desirable to provide a system which obviates the need for a page array imaging lens that images the page array of binary information onto a small area of the holographic storage medium.

SUMMARY OF THE INVENTION

A holographic memory system not requiring a page array imaging lens is constructed using a page array of controllable corner reflectors each individually controlled to be retroflective or non-retroflective. A laser beam is deflected to any one of a plurality of illumination holograms to illuminate the page array of corner reflectors. A holographic storage medium for recording many page holograms is positioned close to the array of illumination holograms to receive the deflected laser beam as a reference beam and a reflection from the page array of corner reflectors as an object beam, whereby to record a page array of binary information on the hologram storage medium with a high information packing density due to having the equivalent of a very large effective imaging lens aperture.

DESCRIPTION

Figure 1:
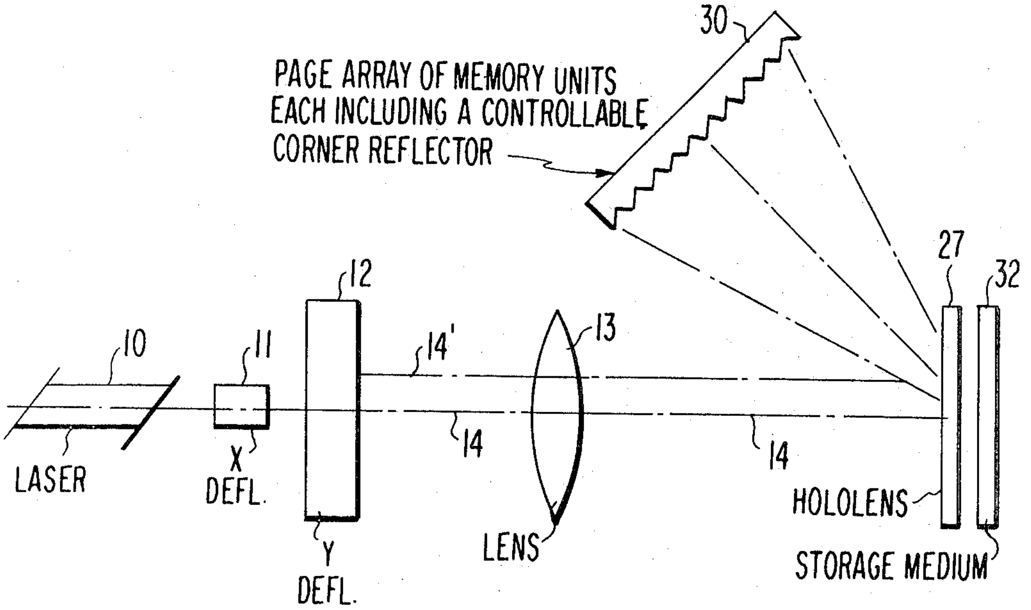
FIG. 1 is a diagram of an electrically and optically accessible memory constructed according to the teachings of the invention.

Referring now in greater detail to FIG. 1, the memory shown includes a laser 10, an X direction deflector 11, a Y direction deflector 12, and a collimating lens 13. The laser 10 may be a conventional pulsed gas laser operating in a single transverse mode to produce a polarized and well-collimating beam. The X and Y beam deflectors 11 and 12 may be known digital light deflectors operating in response to electrically induced acoustic waves in a transparent liquid or solid medium. Alternatively, the deflectors may be known digital light deflectors including stages of polarization rotators each followed by a doubly-refracting bi-refringent crystal such as calcite. The light beam passing through the deflectors 11 and 12 may follow an undeflected path 14, or any one of many X and Y deflected paths such as 14'. A deflected beam, after passing through the collimating lens 13, follows a path to a hololens 27, and to an erasable holographic storage medium 32.

The hololens 27 is an array of illumination holograms each located at a different X and Y addressable location. The laser beam may be deflected to impinge on any one of the individual illumination holograms in the array 27. Each one of the illumination holograms in the array 27 is constructed so that when impinged by the laser beam, light is reflected from the hologram to illuminate an array 30 of binary memory units each including a controllable corner reflector. Each illumination hologram may be constructed so that it illuminates solely the corner reflectors in the area 30, and does not waste light on the spaces between the corner reflectors. Each hologram in the array 27 of illumination holograms may be constructed using an array of pin holes located at the place occupied by the array 30 of memory units to create an object beam which interferes with a deflected laser reference beam in a light-sensitive film located at the place of the array 27.

Further information on the construction of a suitable reflective illumination hologram may be found in U.S. Pat. No. 3,631,411 issued on Dec. 28, 1971, to W. F. Kosonocky, and entitled "Electrically and Optically Accessible Memory". Pertinent information is contained in paragraphs starting at Line 51 of Column 6, Line 4 of Column 7, and Line 48 of Column 8 of the patent. FIGS. 8 and 9 of the patent show a reflective-type illumination hologram 127' as distinguished from the illumination-type hologram 127. Also see FIG. 7 of U.S. Pat. No. 3,647,275 issued on Mar. 7, 1972, to J. H. Ward for an illustration of the formation of a transmission-type image at 68 from a hologram 54, and the formation of a reflective-type image at 70 from the hologram, the latter being described in the last paragraph in Column 4 of the patent.

Figure 2:
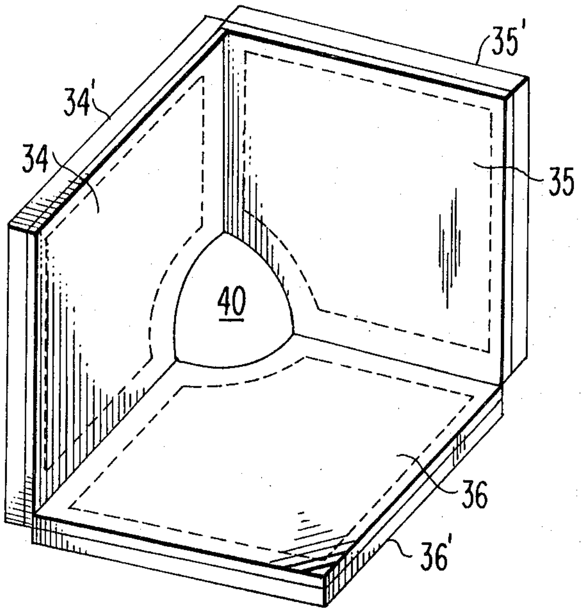
FIG. 2 is a perspective view of an individual corner reflector such as may be included in an array of controllably corner reflectors shown in FIG. 1.

Each memory unit in the page array 30 of memory units includes a corner reflector as shown in FIG. 2. The corner reflector includes three mutually perpendicular planar facets 34, 35 and 36. It is a well-known property of a corner reflector that an incident ray of light is reflected, after three reflections within the corner mirror, in a direction anti-parallel to its incident direction. The incident ray may enter the corner reflector at any angle within a relative broad solid angle. If a broad beam of parallel rays is incident to the corner reflector, the reflected beam precisely coincides with the incident beam. More detailed information on corner reflectors is given in an article by H. D. Eckhardt entitled "Simple Model of Corner Reflector Phenomenon" appearing in Applied Optics, Vol. 10, No. 7, July 1971, pp. 1559–1566.

The corner reflector shown in FIG. 2 is controllable so that it either reflects or spreads an incident light beam. The deflector includes three frames 34', 35' and 36', each supporting a thin flexible reflecting membrane designated 34, 35 and 36. Each thin membrane normally presents a very flat reflecting surface. Each membrane may, however, be displaced by an electric voltage so that it is no longer flat, but has a surface which spreads and scatters an incident light beam. Since an incident ray of light is normally reflected from all three surfaces of the corner reflector, any small departure from flatness of one or more of the reflecting surfaces will prevent reflection of an incident beam back along a path parallel to the incident beam. The corner reflector as shown in FIG. 2 is provided with a central aperture in the reflecting surfaces to accomodate a photosensor 40.

Figure 3A:
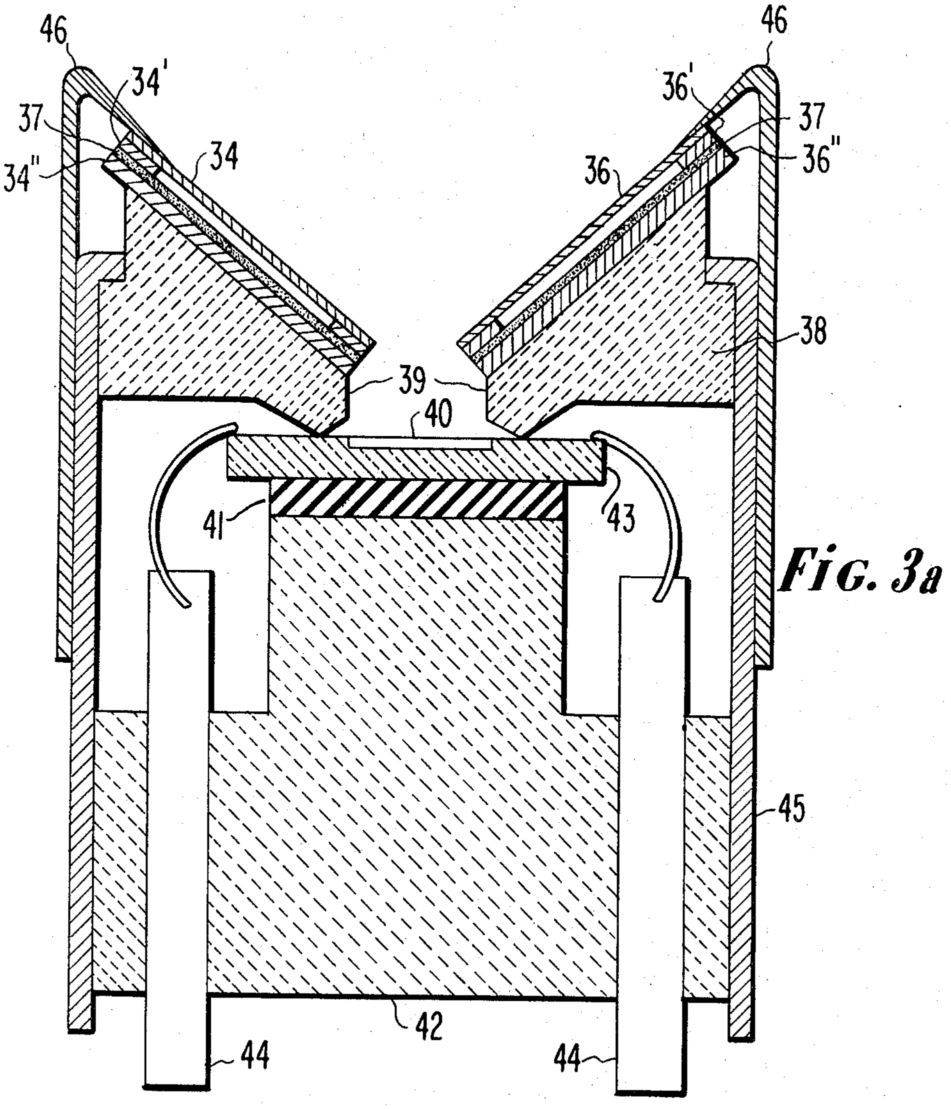
FIGS. 3*a* and 3*b* are sectional views of individual memory units including corner reflectors, suitable for use in the memory system of FIG. 1.

FIG. 3a shows a preferred structure of an individual memory unit of the type shown in FIG. 2. The three facets or faces 34, 36 of the corner mirror are made of a very thin reflective metal such as nickel 2,000 to 4,000 A thick. The membranes are mounted on frames 34', 36' which support the membranes a few microns above metallic substrates 34'', 36''. The membranes are electrically insulated by layers 37 from the respective substrates so that an electric potential can be connected thereacross. The three metallic substrates are glued in place in a molded corner ceramic holder 38. The ceramic holder has a central opening, the walls 39 of which have a metallic coating and three protuberances for electrically connecting the metallic substrates to an integrated circuit chip 43. The integrated circuit semiconductor chip 43 is mounted so that a photosensor 40 on the chip is exposed to receive light through the opening in the corner of the corner reflector.

The chip 43 rests on a resilient pad 41 made of rubber or fiber glass, itself resting on the ceramic base plug 42. The chip 43 is connected to conventional pins 44 held in the plug 42 by a conventional ultrasonic bonding technique. The bonding is done before the assembled plug and chip are inserted into a metal cylinder 45, which engages the ceramic corner holder 38, serves as the holder for ceramic base 42, and serves as the overall structural member of the unit. Thus, the chip and associated structure, and the light controlling part, are made separately, are separately tested, and are then assembled together by simply pushing the chip 43 against the ceramic corner mirror holder 38 until it touches the three protuberances. An appropriate closed conducting path is provided on the chip so that it is sufficient if any one of the protuberances touches the chip to obtain proper contact to all three membrane substrates.

The integrated circuit chip 43, in addition to including a photosensor area 40 in its center, also includes a bistable circuit or flip-flop for electrically storing an information bit, various logic gates, a sense amplifier, and output driving transistors connected through contacts 46 to drive the membranes 34, 35, and 36. The reflecting or non-reflecting condition of the corner reflector is determined by the state of the bistable circuit. Power supply and accessing signals are connected via pins, such as pins 44. The bistable circuit may be as described in U.S. Pat. No. 3,619,665 issued on Nov. 9, 1971 to W. F. Kosonocky and entitled "Optically Settable Flip-Flop".

The individual memory units shown in FIGS. 2 and 3 are arranged and connected in an array forming a randomly and electrically accessible semiconductor "page" memory. The semiconductor page memory is conventional to the extent that it includes a planar array of electrically-accessible flip-flops for storing a corresponding number of binary information bits. In addition, each flip-flop is provided with a photosensor by which the flip-flop can be set in response to received light, and is provided with a corner reflector controlled by the state of the flip-flop. The page array 30 of memory elements is thus like the page array 30 in U.S. Pat. No. 3,656,121, supra, except that controllable corner reflectors are used in place of light valves.

Figure 3B:
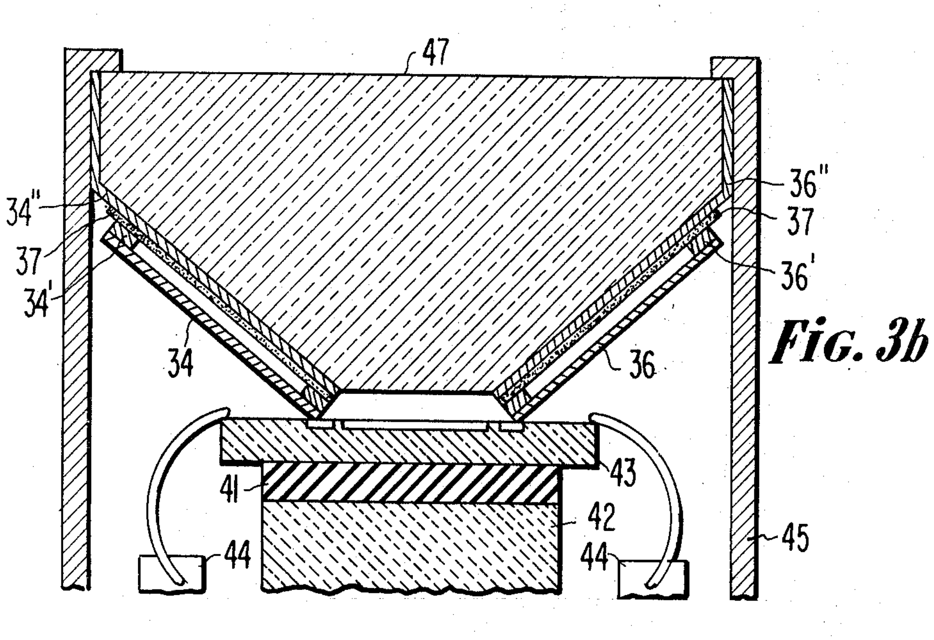

FIG. 3b shows an alternative structure which differs from the structure of FIG. 3a in including a glass corner mirror prism 47. The three facets of the prism are provided with transparent conductive coatings 34'', 36'', and transparent electrically-insulating coatings 37. Frames 34', 36' normally support flexible electrically-conductive black membranes 34, 36 in spaced relation with the prism facets. Under this condition the prism 47 is a perfect corner reflector. However, when an electric potential is applied between membranes 34, 36 and conductive coatings 34'', 36'', the membranes contact the prism facets and spoil them as light reflecting surfaces.

The erasable holographic storage medium 32 of FIG. 1 may be constructed of manganese bismuth in a known manner. Any other known suitable holographic storage medium may be used, including photographic film, thermoplastic-photoconductor devices, and ferroelectric materials such as lithium niobate, for example.

Operation

Figure 4:
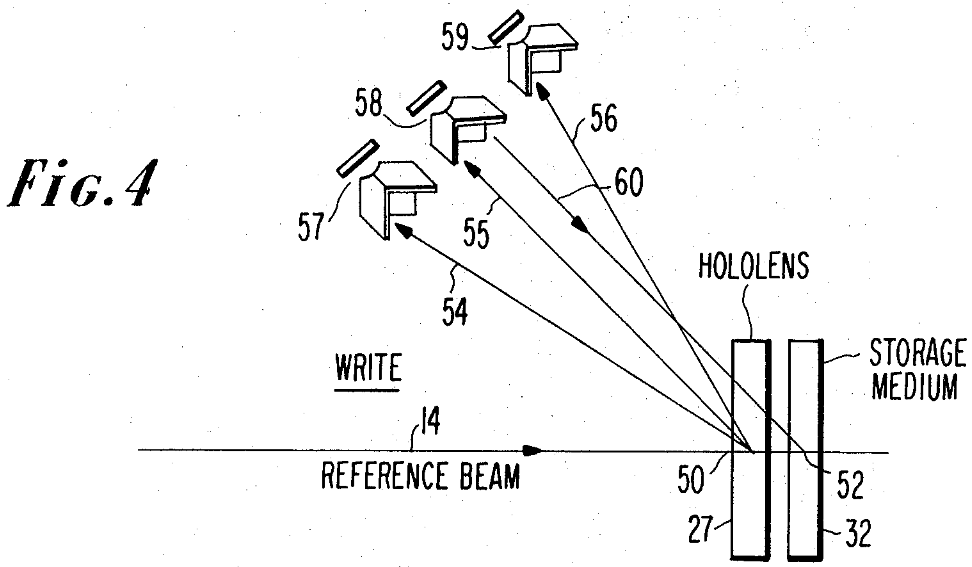
FIG. 4 is a diagram which will be referred to for the purpose of describing how the writing or recording of binary information is accomplished in the memory system of FIG. 1.

Reference is now made to FIG. 4 for a description of how the memory system of FIG. 1 operates in the storage of binary information on an erasable holographic storage medium 32. The light beam 14 from the laser is deflected to a desired individual illumination hologram at point 50 on the hololens or array 27 of illumination holograms. The laser beam 14 also continues through the illumination hologram to a hologram storing point 52 on the holographic storage medium 32.

Light impinging on the illumination hologram 50 is partially reflected or refracted along paths 54, 55 and 56 to respective corner reflectors of memory units 57, 58 and 59 illustrative of a page array 30 of memory units. It is assumed that electrical signals are applied to the corner reflectors of memory units 57 and 59 to spoil them as retro-reflectors, so that light is not returned back to the storage medium 32. On the other hand, the corner reflector of memory unit 58 is operative to return light along the same and parallel paths designated 60 through the array 27 of illumination holograms to the point 52 in the storage medium 32. The light thus returned as an object beam to the storage medium 32 interferes with the light of laser beam 14 acting as a reference beam to create a hologram at point 52 of the array of memory elements 57, 58 and 59. It will be appreciated that the laser reference beam 14 may be deflected to impinge on any other illumination hologram in the array 27 to similarly illuminate the corner reflectors 57, 58 and 59, and to similarly create a hologram in the storage medium 32 at a point reached by the deflected laser beam 14.

Figure 5:
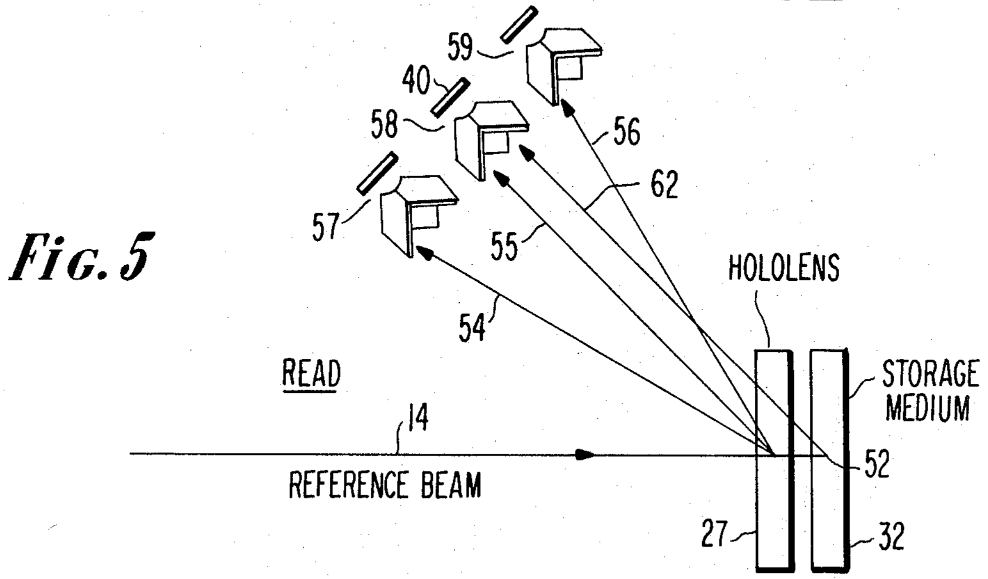
FIG. 5 is a diagram which will be referred to in describing how the binary information is read out of or reproduced from the memory system of FIG. 1.

Reference is now made to FIG. 5 for a description of the manner in which binary information recorded on the holographic storage medium 32 (as described with reference to FIG. 4) may be read out in optical form and translated to electrical binary signals. The laser beam 14 is directed as a reference beam through the array 27 of illumination holograms to a point 52 at which the desired hologram of a page array of binary information is stored. The reference beam 14, in passing through the array 27 of illumination holograms, undesirably causes an illumination of the memory units 57, 58 and 59 along the same paths 54, 55 and 56 which are useful in FIG. 4 for recording binary information. At the same time, the reference beam 14 reaching the hologram at 52 in storage medium 32, causes a refraction or reflection of light along a path 62 to the memory unit 58. This light, or a portion thereof, passes through the opening in the corner reflector and impinges on the associated photosensor 40.

The signal current generated by the light impinged on the photosensor 40 causes a setting of the associated semiconductor bistable circuit to put the circuit in a state which indicates the storage of a 1 binary bit. The other memory units, 57 and 59, do not receive light from the storage medium 32 and, consequentially, the bistable circuits therein remain in the state representing the storage of 0's. The memory units can then be electrically accessed in the usual manner to supply electrical signals representing the binary information read out from the holographic storage medium 32.

Figure 6:
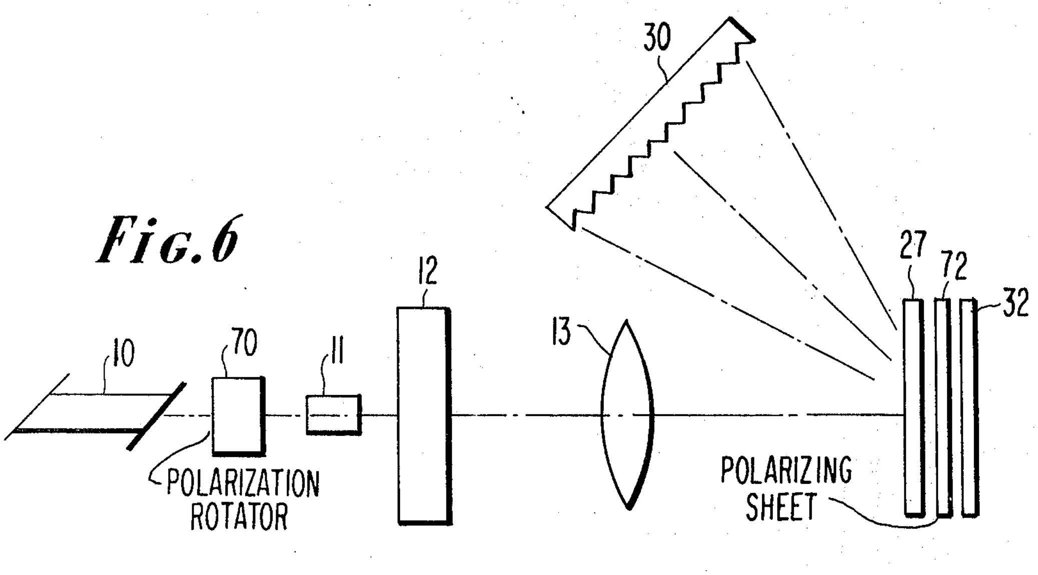
FIG. 6 is a diagram different from the diagram of FIG. 1 in including means to improve the signal-to-noise ratio of binary information read from the memory.

The light which is undesirably directed over paths 54, 55 and 56 to the memory units from the illumination hologram in FIG. 5 is light of a constant intensity which undesirably reduces the signal-to-noise ratio of optical information received by the memory units 57, 58 and 59. Reference is now made to FIG. 6 for a description of a scheme for overcoming the undesirable reduction in signal-to-noise ratio of optical information received by the memory units.

FIG. 6 shows a system which differs from the system shown in FIG. 1 in that a high-speed continuous rotator 70 of the polarization of light is inserted in the light beam path following the laser 10, and in that a polarizing sheet 72 is inserted between the array 27 of illumination holograms 27 and the holographic storage medium 32. The rotator 70 may be commercially available Faraday polarization rotator, or an acoustic polarization rotator, and may, for example, rotate the polarization at a rate of 10 MHz.

In operation, the light reflected to the page array 30 from the array 27 of illumination holograms is unaffected by the rotating polarization of the light beam because the illumination hologram equally reflects light having all directions of polarization. On the other hand, the light reflected to the page array 30 from the storage medium 32 is modulated at a 20 MHz rate because the light with rotating polarization goes through the polarizing sheet 72, and is thus caused to vary from a zero or minimum value to a maximum value twice per cycle of the 10 MHz rate. The electronic sensing circuits in the semiconductor chips 43 are made to be synchronous detectors responsive to signals having the 20 MHz frequency. The sensing circuits are responsive to the 1 and 0 information carried as amplitude modulation on the 20 MHz signal produced by light reflected from the storage medium 32, and the sensing circuits are unresponsive to the constant amplitude signal produced by reflection from the illumination hologram. In this way, the signal-to-noise ratio of the system is improved.

Another way to overcome the effect during readout of the constant illumination of the page array 30 of memory units by light from the illumination hologram 27 is to construct the page array of memory units so that each memory unit includes two corner reflectors with respective photosensors, and one bistable circuit, per information bit. Each memory unit may be constructed as described in my copending application Ser. No. 136,328, filed on Apr. 22, 1971, now U.S. Pat. No. 3,753,247 issued on Aug. 14, 1973, and entitled "Array of Devices Responsive to Differential Light Signals", with the exception that the light valves referred to are implemented as controllable corner reflectors. In this system, a 1 is written by having only one of the two corner reflectors reflective, and a 0 is written by having the other one of the corner reflectors reflective. When reading, the light reflected from the illumination hologram 27 goes in equal quantities to the two photosensors of a memory unit and is cancelled in the differential sensing circuit. On the other hand, the light reflected from the storage medium 32 goes in unequal quantities of the two photosensors and is detected as an information bit. A 1 or a 0 information bit is detected depending on whether a greater amplitude of light is received by one or the other of the two photosensors of the memory unit.

Figure 7:
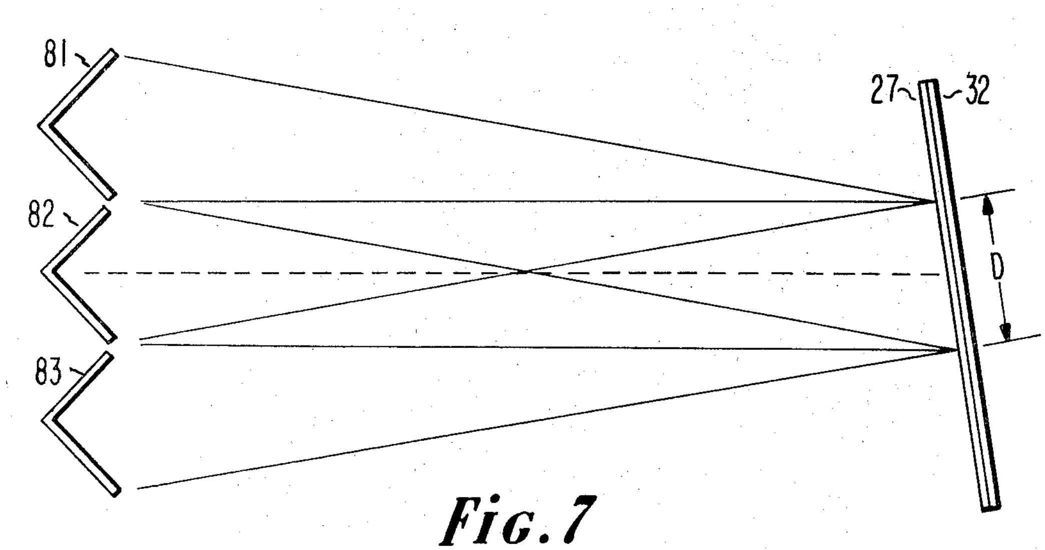
FIG. 7 is a diagram which will be referred to in describing certain dimensional factors in the system of FIG. 1.
Figure 8:
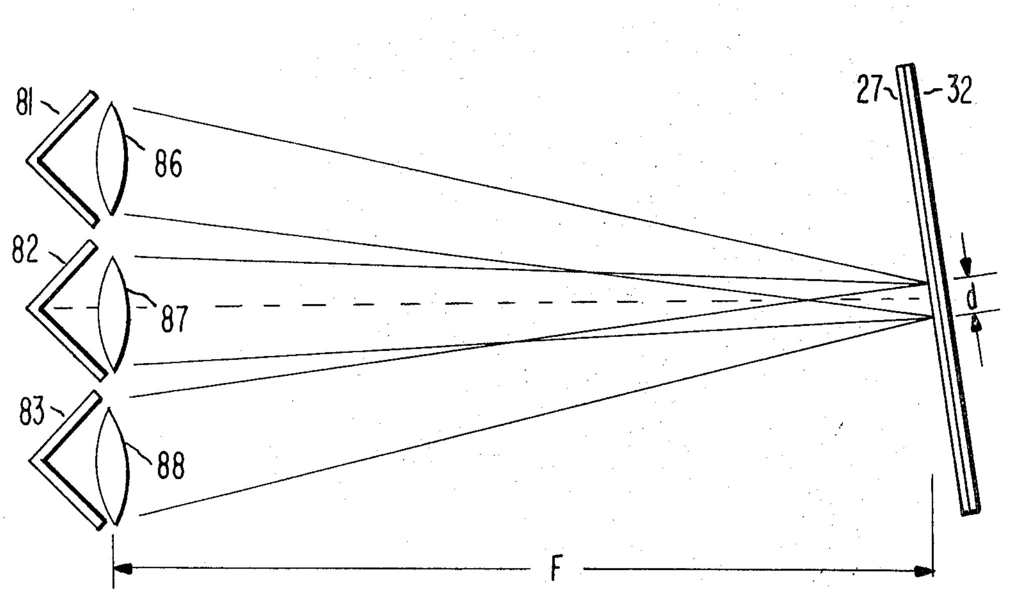
FIG. 8 is a diagram showing a modification of the system of FIG. 1 by the addition of lenses in front of respective corner reflectors.

FIG. 7 will now be referred to in describing a relationship which exists between the size of each retromirror or corner reflector in the page array 30, and the size of the hologram formed on the holographic storage medium 32. Three of many corner reflectors in the page array 30 of memory units are shown at 81, 82 and 83. The dimension D represents the size of individual illumination hologram on the hololens or array 27 of illumination holograms. Laser light reflected from the illumination hologram in array 27 to the corner reflectors 81, 82 and 83 returns to the area D of the holographic storage medium 32 to form an information hologram having the dimension D. The dimension D of the information hologram is determined by the size of the corner reflectors and is the projection of the area of the corner reflectors on the plane of the storage medium 32. This is necessarily true since an individual ray of light reflected from a corner reflector returns along a path parallel to and spaced from the path of the incident ray.

The size of the corner reflectors and the related size D of the information hologram determines the number of information holograms which can be stored on a given area of the storage medium 32. The packing density of the information holograms on medium 32 can be increased by decreasing the size of the corner reflectors. If this is impractical or undesirable, the packing density can be increased by positioning a lens in front of each corner reflector as shown in FIG. 8. Each lens 86, 87 and 88 has a focal length F equal to the distance between the corner reflectors and the storage medium. Now, when a laser beam is reflected to the corner reflectors from an illumination hologram of size *d* in the array 27 of illumination holograms, the light reflected back from the corner reflectors forms an information hologram of size *d* on the storage medium 32. The size *d* is any desired amount smaller than the size of the corner reflector because of the use of lenses 86, 87 and 88. This result can not be achieved in the arrangement of FIG. 7. Even if the illumination hologram in FIG. 7 has a dimension smaller than D, the light reflected from the corner reflectors will require a space of dimension D to be reserved on the surface of the storage medium 32 for the information hologram.

The use of lenses 86, 87 and 88 is advantageous because it allows the corner reflectors to be constructed with conveniently ample physical dimensions. The lenses are small-aperture lenses, that is to say, they have a very large *f* number, or ratio of focal length to diameter. Furthermore, the lenses do not need to be of a very high quality, as their aberrations will result in loss of light, but not in loss of resolution of the picture. Therefore, the whole array of lenses consists of fly eye's lenses that can economically be molded from a plastic sheet, for example. It may be desirable to tilt every lens of the array so as to make its axis point to the center of the storing medium in order to minimize the off-axis operation on each lens.

What is claimed is:

1. A holographic memory system, comprising a page array of controllable corner reflectors each individually controlled to be retroflective or nonretroflective, an array of illumination holograms each being a hologram of said page array of corner reflectors, means to deflect a laser beam to any one of said illumination holograms to cause a reflection of light which illuminates said page array of corner reflectors, and a holographic storage medium for recording many page holograms, said storage medium being positioned to receive a reference beam consisting of said deflected laser beam transmitted through said illumination hologram, and to receive an object beam consisting of a reflection passing through said illumination hologram from said page array of corner reflectors, whereby to record a page array of binary information on said holographic storage medium.

2. The combination of claim 1 wherein each of said controllable corner reflectors is constructed with facets in the form of thin reflective membranes which may be distorted from plane reflecting surfaces to light-spreading surfaces by an electrical signal.

3. The combination of claim 1 wherein said controllable corner reflector is constructed with facets which reflect or not depending on whether electrically-controlled backing members are in the spaced or contacting relation with the facets.

4. The combination of claim 1 wherein a lens is positioned in front of each corner reflector.

5. The combination of claim 1 wherein each controllable corner reflector is part of a binary memory unit including a semiconductor bistable circuit having an output controlling the respective corner reflector.

6. The combination of claim 5 wherein each binary memory unit includes a photosensor connected to the input of the respective bistable circuit.

7. The combination of claim 6 wherein each said photosensor is positioned to receive a portion of the light directed into a respective corner reflector.

8. The combination of claim 6 wherein each of said memory units includes two corner reflectors, two photosensors and one bistable semiconductor circuit connected in a balanced arrangement in which one corner reflector is made reflective to write a "1" and the other corner reflector is made reflective to write a "0," whereby, when reading, light is returned to one or the other of the two photosensors depending on the information stored, and the light undesirably returned from the illumination hologram reaches both photosensors in unbalanced cancelling amounts.

9. The combination of claim 6 wherein said array of illumination holograms and said holographic storage medium are arranged in closely-spaced parallel planes.

10. The combination of claim 9, and in addition, a polarizing sheet positioned between said array of illumination holograms and said storage medium, means to rotate the polarization of light at a given high frequency is located in the path of said light beam, and said bistable semiconductor circuits are made responsive to electrical signals, from respective photosensors, having twice said given frequency.

* * * * *